US011550415B2

(12) United States Patent
Lee et al.

(10) Patent No.: US 11,550,415 B2
(45) Date of Patent: Jan. 10, 2023

(54) TOUCH SENSOR, METHOD OF MANUFACTURING TOUCH SENSOR, AND IMAGE DISPLAY DEVICE INCLUDING TOUCH SENSOR

(71) Applicant: DONGWOO FINE-CHEM CO., LTD., Jeollabuk-do (KR)

(72) Inventors: Chi Kwon Lee, Gyeonggi-do (KR); Kyung Yeal Baek, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/369,430

(22) Filed: Jul. 7, 2021

(65) Prior Publication Data
US 2022/0011897 A1  Jan. 13, 2022

(30) Foreign Application Priority Data
Jul. 8, 2020  (KR) ........................ 10-2020-0083971

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 2203/04103* (2013.01); *G06F 2203/04111* (2013.01)

(58) Field of Classification Search
CPC ..................... G06F 3/0446; G06F 2203/04111
See application file for complete search history.

(56) References Cited

U.S. PATENT DOCUMENTS

| 2017/0090634 | A1* | 3/2017 | Yang | ..................... G06F 3/0445 |
| 2018/0182819 | A1* | 6/2018 | Jo | ........................ H01L 51/5284 |
| 2020/0125199 | A1* | 4/2020 | Feng | ..................... G06F 3/0412 |
| 2021/0232262 | A1* | 7/2021 | Feng | ..................... G06F 3/0443 |
| 2022/0066582 | A1* | 3/2022 | Park | ........................ G06F 3/041 |

FOREIGN PATENT DOCUMENTS

WO  2013/063176 A1  5/2013

* cited by examiner

*Primary Examiner* — Robin J Mishler
(74) *Attorney, Agent, or Firm* — The PL Law Group, PLLC

(57) ABSTRACT

A touch sensor according to an embodiment of the present disclosure may include a substrate layer, sensing electrodes that are formed on the substrate layer, an insulation layer that is formed on the substrate layer to cover the sensing electrodes, and a black matrix that is formed on the insulation layer.

17 Claims, 12 Drawing Sheets

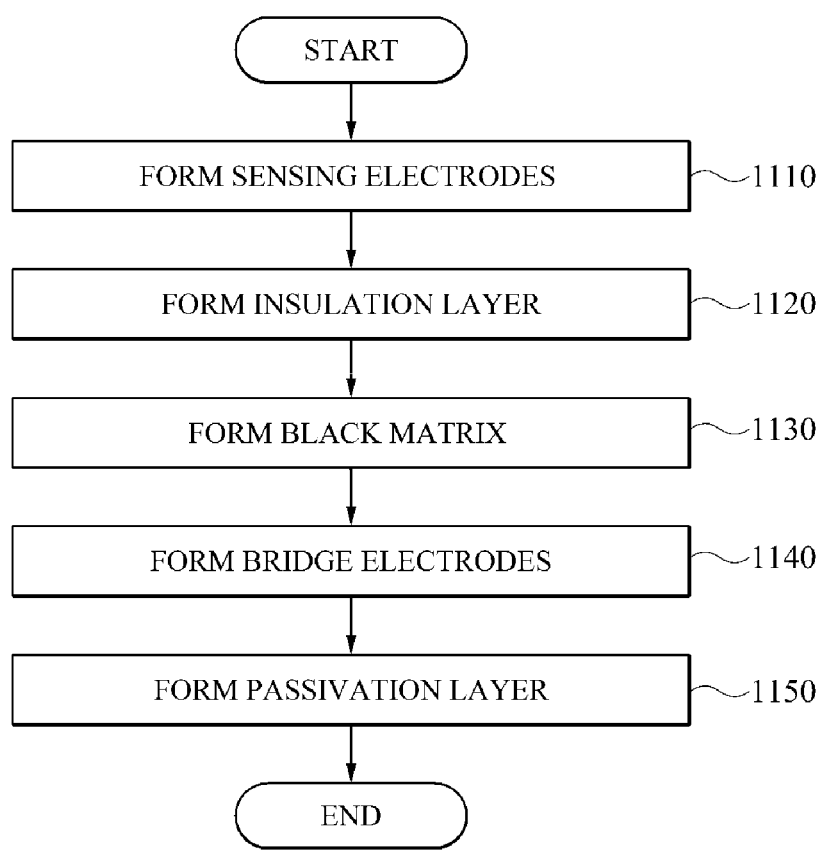

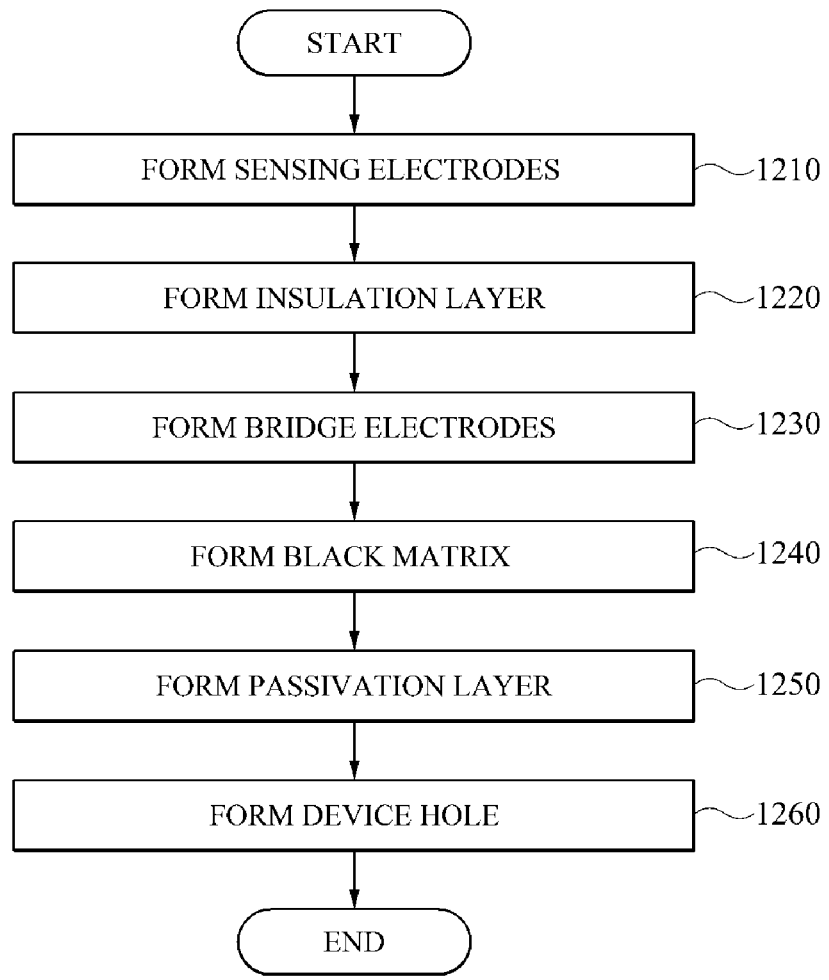

TOUCH SENSOR, METHOD OF MANUFACTURING TOUCH SENSOR, AND IMAGE DISPLAY DEVICE INCLUDING TOUCH SENSOR

CROSS-REFERENCE TO RELATED APPLICATION(S)

This application claims priority to Korean Patent Application No. 10-2020-0083971 filed on Jul. 8, 2020 in the Korean Intellectual Property Office (KIPO), the entire disclosure of which is incorporated by reference herein.

BACKGROUND

1. Field of the Invention

The present invention relates to a touch sensor, a method of manufacturing a touch sensor, and an image display device including the touch sensor.

2. Description of the Related Art

Recently, according to development of the information-oriented society, needs for a display field have also been presented in various forms. For example, various flat panel display devices having characteristics such as a slimness, weight reduction, and low power consumption, etc., for instance, a liquid crystal display device, a plasma display panel device, an electroluminescent display device, an organic light-emitting diode display device, etc., have been studied.

Meanwhile, electronic devices, in which an image display function and an information input function are implement together by combining a touch panel or a touch sensor as an input device attached on the display device so as to allow a user to select instructions displayed on a screen by a finger thereof or an object such as a touch pen and input a command of the user with the display device, have been developed.

The touch sensor includes a plurality of sensing electrodes for sensing a touch. When the touch sensor is disposed on a front surface of the display device, it is necessary to suppress a deterioration in image quality caused by the sensing electrodes. Accordingly, applying a touch sensor having high transmittance or high transparency to the display device is required.

In addition, as various additional functional devices (e.g., cameras, speakers, recorders, optical sensors, lighting, etc.) are coupled to the display device, desired functions of the device may be interrupted or deteriorated by the touch sensor.

Accordingly, there is a need to develop a touch sensor with improved transmittance and optical properties while improving touch sensing sensitivity. For example, as in Korean Patent Laid-Open Publication No. 2014-0092366, a touch screen panel, in which a touch sensor is combined to various image display devices, has recently been developed, but it is difficult to satisfy the above-described properties. Therefore, a high-resolution touch sensor or touch panel with improved optical properties as described above is consistently required.

SUMMARY

It is an object of the present invention to provide a touch sensor, a method of manufacturing a touch sensor, and an image display device including the touch sensor.

To achieve the above objects, the following technical solutions are adopted in the present invention.

1. A touch sensor including: a substrate layer; sensing electrodes formed on the substrate layer; an insulation layer formed on the substrate layer to cover the sensing electrodes; and a black matrix formed on the insulation layer.

2. The touch sensor according to the above 1, further including bridge electrodes formed on the insulation layer to electrically connect some sensing electrodes adjacent to each other among the sensing electrodes, wherein the black matrix is formed so as to at least partially cover a portion of the bridge electrode.

3. The touch sensor according to the above 1, further including bridge electrodes formed on the insulation layer to electrically connect some sensing electrodes adjacent to each other among the sensing electrodes, wherein a portion of the bridge electrode is formed so as to at least partially cover the black matrix.

4. The touch sensor according to the above 1, further including bridge electrodes formed on the insulation layer to electrically connect some sensing electrodes adjacent to each other among the sensing electrodes, wherein the bridge electrodes and the black matrix are spaced apart from each other.

5. The touch sensor according to the above 1, wherein the black matrix is formed by curing a predetermined material at 170° C. to 190° C.

6. The touch sensor according to the above 5, wherein the predetermined material includes carbon black.

7. The touch sensor according to the above 1, wherein the sensing electrodes include a transparent conductive oxide.

8. The touch sensor according to the above 1, wherein the sensing electrodes are formed in a multilayer structure of a transparent conductive oxide layer and a metal layer.

9. The touch sensor according to the above 1, further including bridge electrodes formed on the insulation layer to electrically connect some sensing electrodes adjacent to each other among the sensing electrodes, wherein the sensing electrodes include: first sensing electrodes which form a sensing channel row; and second sensing electrodes which form a sensing channel column, wherein the bridge electrodes electrically connect the second sensing electrodes adjacent to each other in a column direction.

10. The touch sensor according to the above 9, wherein the insulation layer includes contact holes to which surfaces of the second sensing electrodes are partially exposed; and the bridge electrodes are formed on the insulation layer to fill the contact holes.

11. The touch sensor according to the above 1, further including a passivation layer formed on the insulation layer to cover the black matrix.

12. The touch sensor according to the above 1, further including a separation protective layer formed on an upper surface of the substrate layer.

13. The touch sensor according to the above 1, further including a device hole which penetrates the black matrix.

14. The touch sensor according to the above 13, wherein the device hole penetrates a central portion of the black matrix while leaving a peripheral portion of the black matrix.

15. An image display device including: a display panel; and the touch sensor according to the above 1 laminated on the display panel.

16. A method of manufacturing a touch sensor including: forming first sensing electrodes and second sensing electrodes on a substrate layer or a separation protective layer; forming an insulation layer to cover the first sensing electrodes and the second sensing electrodes on the substrate layer or the separation protective layer; forming a black matrix on the insulation layer; and forming a passivation layer on the insulation layer to cover the black matrix.

17. The method of manufacturing a touch sensor according to the above 16, wherein the step of forming the black matrix includes curing a predetermined material at 170° C. to 190° C. to form the black matrix.

18. The method of manufacturing a touch sensor according to the above 16, further including forming bridge electrodes on the insulation layer to electrically connect second sensing electrodes adjacent to each other.

19. The method of manufacturing a touch sensor according to the above 16, further including forming a device hole through the black matrix.

20. The method of manufacturing a touch sensor according to the above 19, wherein the device hole penetrates a central portion of the black matrix while leaving a peripheral portion of the black matrix.

Since the black matrix for indicating a position where a device hole into which a functional element of the image display device can be inserted is formed on the insulation layer, it is possible to reduce a damage to the touch sensor due to static electricity caused from an outside.

BRIEF DESCRIPTION OF THE DRAWINGS

The above and other objects, features and other advantages of the present invention will be more clearly understood from the following detailed description taken in conjunction with the accompanying drawings, in which:

FIG. 11 is a flowchart illustrating a method of manufacturing a touch sensor according to another embodiment; and FIG. 12 is a flowchart illustrating a method of manufacturing a touch sensor according to another embodiment.

DETAILED DESCRIPTION

Figure 1:
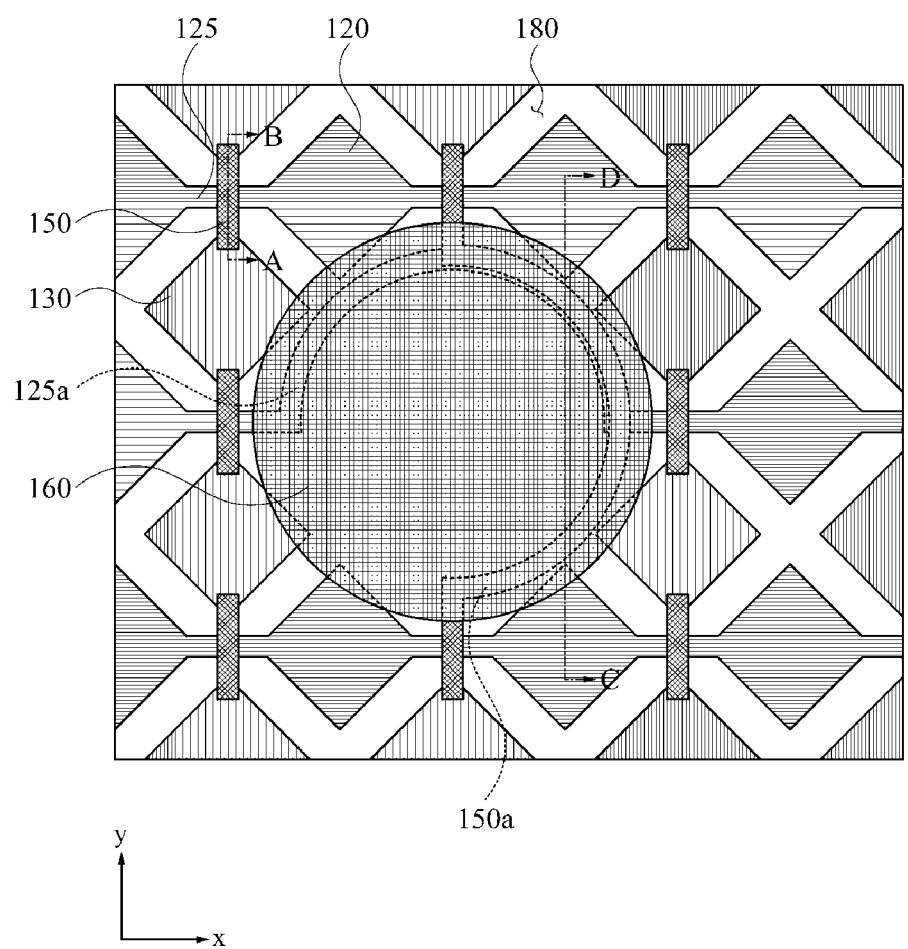
FIG. 1 is a schematic plan view illustrating a touch sensor according to an embodiment.

Hereinafter, embodiments will be described in detail with reference to the accompanying drawings. In denoting reference numerals to components of respective drawings, it should be noted that the same components will be denoted by the same reference numerals although they are illustrated in different drawings.

In description of preferred embodiments of the present invention, the publicly known functions and configurations that are judged to be able to make the purport of the present invention unnecessarily obscure will not be described in detail. Further, wordings to be described below are defined in consideration of the functions of the embodiments, and may differ depending on the intentions of a user or an operator or custom. Accordingly, such wordings should be defined on the basis of the contents of the overall specification.

It will be understood that, although the terms first, second, etc. may be used herein to describe various elements or components, these elements or components should not be limited by these terms. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or a combination thereof, but do not preclude the presence or addition of one or more other features, integers, steps, operations, elements, components, and/or a combination thereof.

In addition, directional terms such as "one side," "the other side," "upper," "lower," "row direction," "column direction," "X direction," "Y direction," etc. are not intended to designate an absolute direction but are used to relatively express different directions in connection with the orientation of the disclosed drawings. Since the elements or components of the embodiments of the present invention may be located in various orientations, the directional terms are used for illustrative purposes, and are not intended to limit the present invention thereto.

In addition, a division of the configuration units in the present disclosure is intended for ease of description and divided only by the main function set for each configuration unit. That is, two or more of the configuration units to be described hereinafter may be combined into a single configuration unit or formed by two or more of divisions by function into more than a single configuration unit. Further, each of the configuration units to be described hereinafter may additionally perform a part or all the functions among functions set for other configuration units other than being responsible for the main function, and a part of the functions among the main functions set for each of the configuration units may be exclusively taken and certainly performed by other configuration units FIG. 1 is a schematic plan view illustrating a touch sensor according to an embodiment, FIG. 2 is a cross-sectional view of the touch sensor taken on line A-B in FIG. 1, and FIG. 3 is a cross-sectional view of the touch sensor taken on line C-D in FIG. 1.

Figure 2:
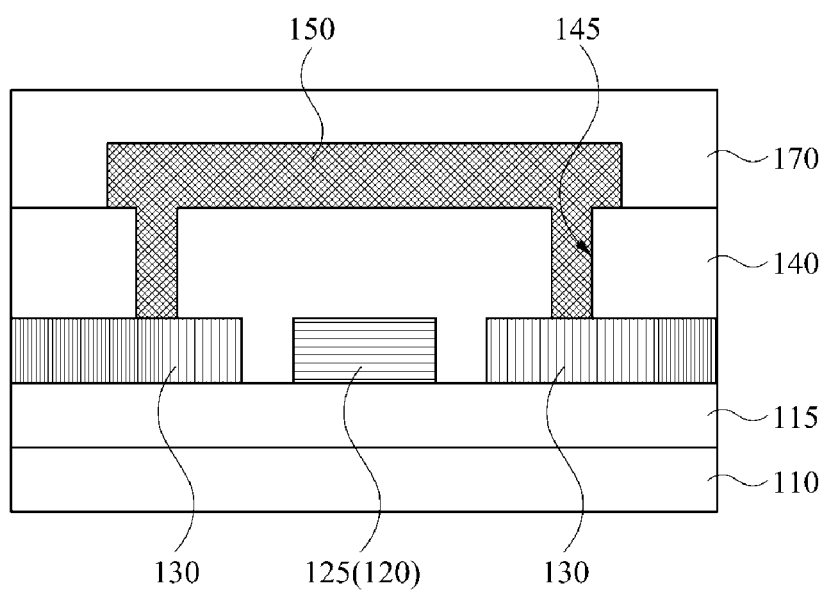
FIG. 2 is a cross-sectional view of the touch sensor taken on line A-B in FIG. 1.
Figure 3:
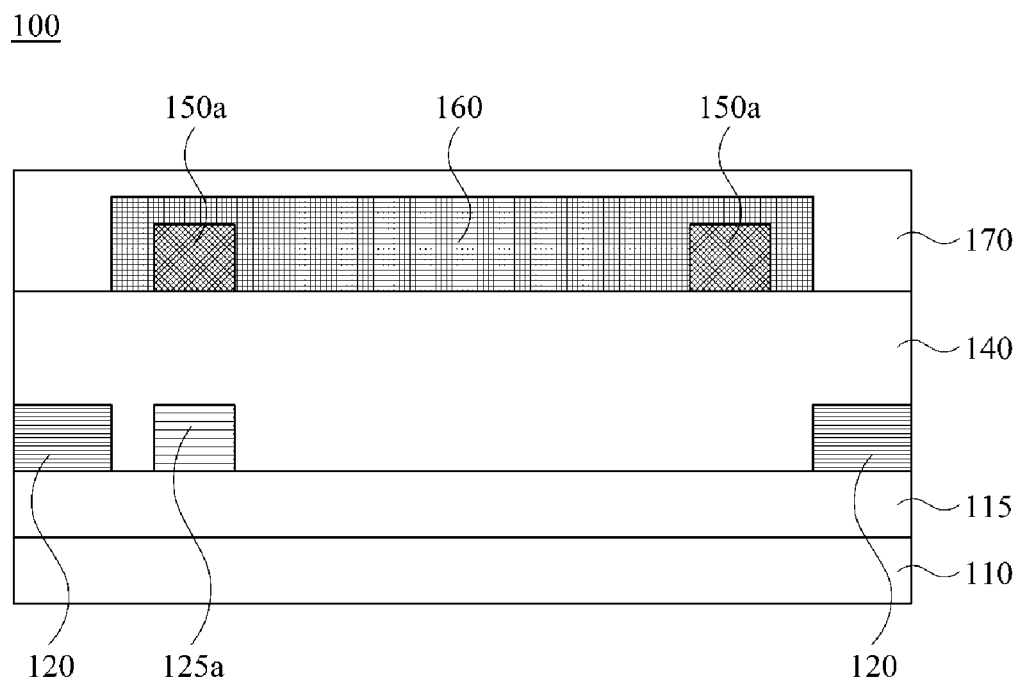
FIG. 3 is a cross-sectional view of the touch sensor taken on line C-D in FIG. 1.

Referring to FIGS. 1 to 3, a touch sensor 100 may include a substrate layer 110, a plurality of sensing electrodes 120 and 130, an insulation layer 140, bridge electrodes 150, and a black matrix (BM) 160.

The substrate layer 110 may include a film-type substrate used as a support layer to form the sensing electrodes 120 and 130. According to an embodiment, the substrate layer 110 may refer to a display panel on which the sensing electrodes 120 and 130 are directly formed.

According to an embodiment, the substrate layer 110 may include a substrate or a film material commonly used in the touch sensor without particular limitation thereof. For example, the substrate layer 110 may include glass, a polymer material and/or an inorganic insulation material. In this case, the polymer material may include a cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA) and the like. The inorganic insulation material may include silicon oxide, silicon nitride, silicon oxynitride, metal oxide and the like.

According to an embodiment, the substrate layer 110 may be formed in a multilayer structure. For example, the substrate layer 110 may be formed in a multilayer structure of an organic insulation layer and an inorganic insulation layer.

A layer or film member of an image display device into which the touch sensor 100 is inserted may be provided as the substrate layer 110. For example, an encapsulation layer or passivation layer, a protective film, a polarizing plate, a window film, a retardation film, a barrier film, and the like included in the display panel of the image display device may be provided as the substrate layer 110.

The sensing electrodes 120 and 130 may include first sensing electrodes 120 and second sensing electrodes 130 which are formed on the substrate layer 110. For example, the sensing electrodes 120 and 130 may be arranged so as to be driven in a mutual capacitance method.

The first sensing electrodes 120 may be arranged, for example, in an x-direction (or a row direction). The first sensing electrodes 120 adjacent to each other in the x-direction (or row direction) may be connected with each other by connection parts 125. A connection part 125a formed in a region of being overlapped with the black matrix 160 (hereinafter, referred to as an overlapping region) may be formed along an outer periphery of the overlapping region so as not to cross a central portion of the overlapping region, and the first sensing electrodes 120 adjacent to each other with the overlapping region interposed therebetween may be connected with each other by the connection part 125a formed along the outer periphery of the overlapping region. The first sensing electrodes 120 and the connection parts 125 may be integrally connected with each other to provide as a substantially single member. In this case, the first sensing electrodes 120 and the connection parts 125 may be patterned together from the same conductive film and located on the same layer or on the same level. Thereby, a first sensing channel row extending in the x-direction (or row direction) may be defined, and a plurality of first sensing channel rows may be arranged in a y-direction (or column direction).

The second sensing electrodes 130 may be arranged in, for example, the y-direction (or column direction) and may have a pattern form of an independent island. The second sensing electrodes 130 adjacent to each other in the y direction (or column direction) may be electrically connected with each other by the bridge electrodes 150. A bridge electrode 150a formed in the overlapping region may be formed along the outer periphery of the overlapping region so as not to cross the central portion of the overlapping region, and the second sensing electrodes 130 adjacent to each other with the overlapping region interposed therebetween may be connected with each other by the bridge electrode 150a formed along the outer periphery of the overlapping region. Thereby, a second sensing channel column extending in the y direction (or column direction) may be defined, and a plurality of second sensing channel columns may be arranged in the x direction (or row direction).

According to an embodiment, the x-direction and the y-direction are parallel to an upper surface of the substrate layer 110 and may cross perpendicular to each other.

The bridge electrode 150 may connect the second sensing electrodes 130 adjacent to each other with the connection part 125 connecting the first sensing electrodes 130 interposed therebetween. As described above, the bridge electrode 150a formed in the overlapping region may be formed along the outer periphery of the overlapping region so as not to cross the central portion of the overlapping region, thus to connect the second sensing electrodes 130 adjacent to each other with the overlapping region interposed therebetween.

According to an embodiment, the insulation layer 140 for covering the sensing electrodes 120 and 130 may be formed on the substrate layer 110. The insulation layer 140 may include contact holes 145 to which upper surfaces of the second sensing electrodes 130 are partially exposed. The bridge electrode 150 may be formed on the insulation layer 140 to fill the adjacent contact holes 145.

According to an embodiment, the sensing electrodes 120 and 130 and/or the bridge electrode 150 may include metal, a metal alloy, a metal wire, or a transparent conductive oxide, and may be formed in a mesh structure.

For example, the sensing electrodes 120 and 130 and/or the bridge electrode 150 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in combination of two or more thereof. For example, the sensing electrodes 120 and 130 and/or the bridge electrode 160 may include silver (Ag) or a silver alloy (e.g., a silver-palladium-copper (APC) alloy) to implement a low resistance. As another example, the sensing electrodes 120 and 130 and/or the bridge electrode 160 may include copper (Cu) or a copper alloy (e.g., a copper-calcium (CuCa) alloy) in consideration of low resistance and fine linewidth patterning.

The sensing electrodes 120 and 130 and/or the bridge electrode 150 may include a transparent conductive oxide such as indium tin oxide (ITO), indium zinc oxide (IZO), zinc oxide (ZnO), indium zinc tin oxide (IZTO), cadmium tin oxide (CTO) and the like.

Since the sensing electrodes 120 and 130 and/or the bridge electrode 150 are formed by including the above-described transparent conductive oxide, entire transmittance of the touch sensor 100 may be improved.

According to an embodiment, the sensing electrodes 120 and 130 and/or the bridge electrode 150 may be formed in a lamination structure of a transparent conductive oxide and a metal. For example, the sensing electrodes 120 and 130 and/or the bridge electrode 150 may have a two-layer structure of transparent conductive oxide layer-metal layer or a three-layer structure of transparent conductive oxide layer-metal layer-transparent conductive oxide. In this case, resistance may be reduced to improve signal transmission speed while improving flexible properties by the above-described metal layer, and corrosion resistance and transparency may be improved by the above-described transparent conductive oxide layer.

Dummy regions 180 may be defined between the first sensing electrodes 120 and the second sensing electrodes 130 adjacent to each other. The dummy region 180 may physically and electrically separate the first sensing electrode 120 and the second sensing electrode 130 from each other. According to an embodiment, dummy electrodes including the above-described metal, metal alloy, metal wire, or transparent conductive oxide may be formed in the dummy region 180. By the dummy electrodes, it is possible to prevent or reduce the electrode from being viewed due to a pattern deviation and a difference in optical characteristics in the dummy regions 180.

The insulation layer 140 may be formed on upper surfaces of the substrate layer 110 and the sensing electrodes 120 and 130. As described above, the insulation layer 140 may include the contact holes 145 to which the upper surfaces of the second sensing electrodes 130 are partially exposed, and the bridge electrode 150 may electrically connect the second sensing electrodes 130 adjacent to each other formed on the insulation layer 140 to fill the adjacent contact holes 145.

According to an embodiment, the insulation layer 140 may be formed using an organic insulation material including a resin such as an acrylic resin, an epoxy resin, a urethane resin, a siloxane resin or the like. In this case, a resin composition may be applied to the upper surfaces of the substrate layer 110 and the sensing electrodes 120 and 130 through a printing process or coating processes such as inkjet printing, nozzle printing, spin coating, slit coating, etc. to form a coating film, and then the insulation layer 140 may be formed thereon through a development or etching process.

According to another embodiment, the insulation layer 140 may be formed using an inorganic insulation material such as silicon oxide, silicon oxynitride, silicon nitride or the like. In this case, the inorganic insulation material may be deposited on the upper surfaces of the substrate layer 110 and the sensing electrodes 120 and 130 through a chemical vapor deposition (CVD) process, a physical vapor deposition (PVD) process, etc., and then the insulation layer 140 may be formed thereon through a dry or wet etching process.

The black matrix 160 may be formed on the insulation layer 140. The black matrix 160 may be formed on the insulation layer 140 for indicating a position where a device hole (e.g., a hole which penetrates the touch sensor) into which a functional element of the image display device such as a camera, speaker, recorder, lighting, optical sensor, biometric sensor, etc. can be inserted. For example, the black matrix 160 may be formed on the insulation layer 140 by curing a black matrix material at 170° C. to 190° C., and more preferably at 180° C. According to an embodiment, the black matrix material may include a material having high resistance and high optical density (OD), such as carbon black.

According to an embodiment, the black matrix 160 may be formed on the insulation layer 140 to cover a portion of the bridge electrode 150. That is, the bridge electrode 150 is formed on the insulation layer 140, and then the black matrix 160 may be formed on the insulation layer 140 to cover a portion of the bridge electrode 150. For example, as shown in FIGS. 1 and 3, the black matrix 160 may be formed so as to partially cover the bridge electrode 150a. But, it is not limited thereto, and the black matrix 160 may be formed on the same layer as the bridge electrode 150 with being spaced apart from each other.

According to an embodiment, as shown in FIGS. 1 and 3, the black matrix 160 may be formed at a position of being at least partially overlapped with at least one of the connection parts 125 and the sensing electrodes 120 and 130. But, it is not limited thereto, and the black matrix 160 may be formed at a position of not being overlapped with any of the connection parts 125 and the sensing electrodes 120 and 130.

Since the black matrix 160 is formed on the insulation layer 140, it is possible to reduce a damage to the touch sensor 100 due to static electricity caused by an outside.

A passivation layer 170 for covering the bridge electrode 150 and the black matrix 160 may be further formed on the insulation layer 140. The passivation layer 170 may include the above-described inorganic insulation material or the above-described organic insulation material.

Meanwhile, according to an embodiment, the touch sensor 100 may further include a separation protective layer 115 formed on the upper surface of the substrate layer 110.

The separation protective layer 115 may be formed to facilitate a subsequent peeling-off process from a carrier substrate, protect the sensing electrodes 120 and 130 of the touch sensor 100 and establish refractive index matching with the sensing electrodes 120 and 130.

According to an embodiment, in order to facilitate the subsequent peeling-off process from the carrier substrate, the separation protective layer 115 may include a polymer material such as polyimide, polyvinyl alcohol, polyamic acid, polyamide, polyethylene, polystyrene, polynorbomene, phenylmaleimide copolymer, polyazobenzene, polyphenylenephthalamide, polyester, polymethyl methacrylate, polyarylate, cinnamate, coumarin, phthalimidine, chalcone, aromatic acetylene and the like. These materials may be used alone or in combination of two or more thereof.

According to an embodiment, in order to protect the sensing electrodes 120 and 130 of the touch sensor 100 and establish refractive index matching with the sensing electrodes 120 and 130, the separation protective layer 115 may include an inorganic insulation material such as silicon oxide, silicon nitride, silicon oxynitride, etc., or a polymer-based organic insulation material.

In addition, according to an embodiment, the touch sensor 100 may further include an index matching layer for improving visibility added to an upper surface of the separation protective layer 115. The index matching layer may be formed between the separation protective layer 115 and the sensing electrodes 120 and 130 for the purpose of improving visibility through the refractive index matching with the sensing electrodes 120 and 130.

Figure 4:
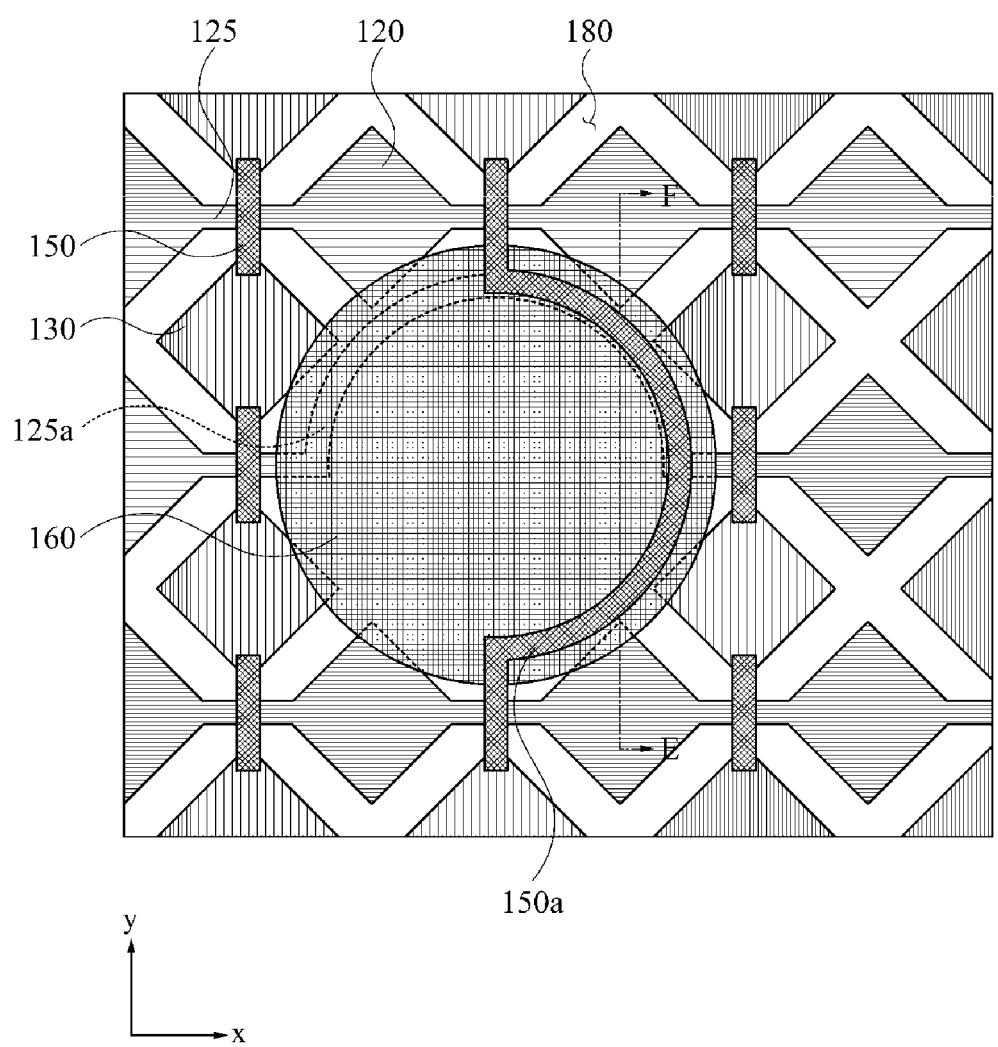
FIG. 4 is a schematic plan view illustrating a touch sensor according to another embodiment.
Figure 5:
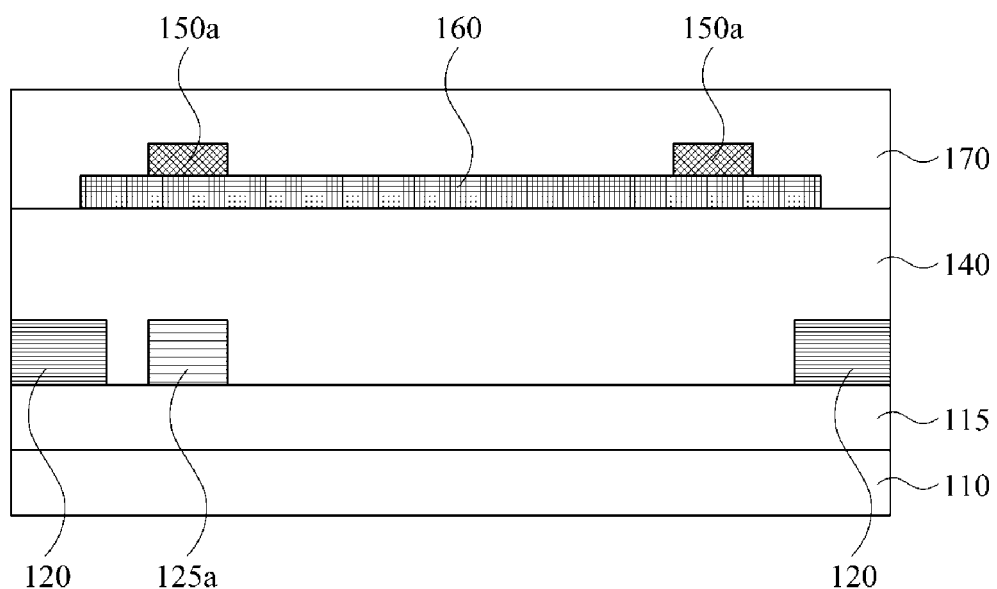
FIG. 5 is a cross-sectional view of the touch sensor taken on line E-F in FIG. 4.

FIG. 4 is a schematic plan view illustrating a touch sensor according to another embodiment, and FIG. 5 is a cross-sectional view of the touch sensor taken on line E-F in FIG. 4. In description of configurations with reference to FIGS. 4 and 5, the substrate layer 110, the separation protective layer 115, the sensing electrodes 120 and 130, the connection part 125, the insulation layer 140, the bridge electrode 150, the black matrix 160 and the passivation layer 170 are the same as those of the configurations described with reference to FIGS. 1 to 3, therefore the same configurations will not be described in detail within the overlapping range.

Referring to FIGS. 4 and 5, unlike the touch sensor 100 shown in FIGS. 1 to 3, in a touch sensor 400 according to an embodiment, at least one bridge electrode 150a of the bridge electrodes 150 may be formed on the insulation layer 140 to cover a portion of the black matrix 160. That is, the black matrix 160 is formed on the insulation layer 140, and then a portion of the bridge electrode 150 may be formed on the insulation layer 140 to partially cover the black matrix 160. But, it is not limited thereto, and the black matrix 160 may be formed on the same layer as the bridge electrode 150 with being spaced apart from each other.

Figure 6:
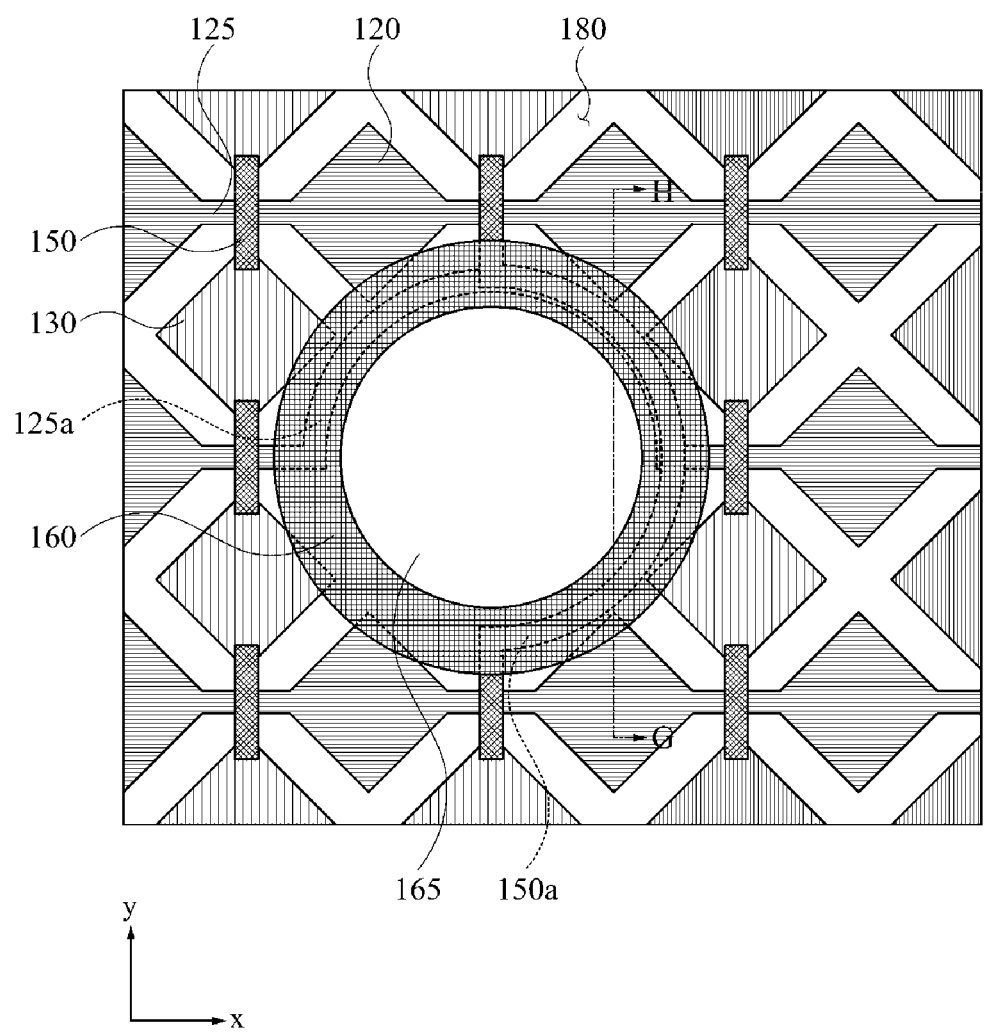
FIG. 6 is a schematic plan view illustrating a touch sensor according to another embodiment.
Figure 7:
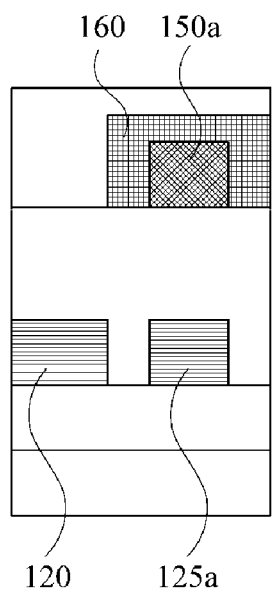
FIG. 7 is a cross-sectional view of the touch sensor taken on line G-H in FIG. 6.
Figure 7:
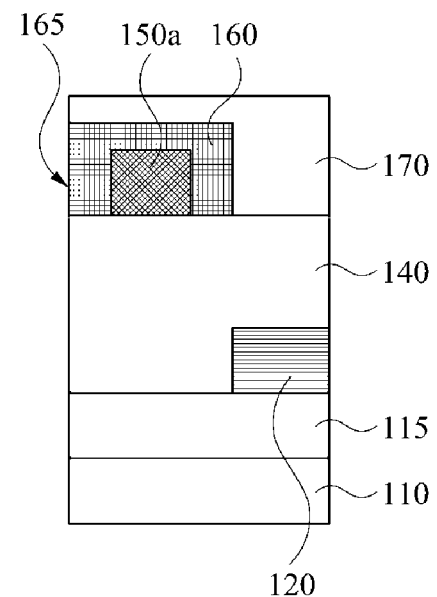

FIG. 6 is a schematic plan view illustrating a touch sensor according to another embodiment, and FIG. 7 is a cross-sectional view of the touch sensor taken on line G-H in FIG. 6. In description of configurations with reference to FIGS. 6 and 7, the substrate layer 110, the separation protective layer 115, the sensing electrodes 120 and 130, the connection part 125, the insulation layer 140, the bridge electrode 150, the black matrix 160 and the passivation layer 170 are the same as those of the configurations described with reference to FIGS. 1 to 3, therefore the same configurations will not be described in detail within the overlapping range.

Referring to FIGS. 6 and 7, a touch sensor 600 according to another embodiment may include a device hole 165.

The device hole 165 may be a hole into which the functional element of the image display device, such as a camera, speaker, recorder, lighting, optical sensor, or biometric sensor can be inserted.

The device hole 165 may be formed by penetrating the black matrix 160 in a thickness direction of the touch sensor perpendicular to the upper surface of the black matrix 160. That is, the position where the device hole 165 is formed may be determined by the position of the black matrix 160.

According to an embodiment, the device hole 165 may be formed by penetrating the passivation layer 170, the black matrix 160, the insulation layer 140, the separation protective layer 115 and the substrate layer 110 in a direction perpendicular to the upper surface of the black matrix 160. In this case, the device hole 165 may have a through hole shape which penetrates the passivation layer 170, the black matrix 160, the insulation layer 140, the separation protective layer 115 and the substrate layer 110.

According to an embodiment, as shown in FIG. 6, the device hole 165 may be formed in a size that does not affect the bridge electrodes 150 adjacent thereto, that is, does not penetrate the sensing electrodes 120 and 130, the connection parts 125, and the bridge electrode 150 adjacent thereto. But, it is not limited thereto, and the device hole 165 may be formed by at least partially penetrating any one or two or more of the sensing electrodes 120 and 130, the connection part 125 and the bridge electrode 150 adjacent thereto.

According to an embodiment, the device hole 165 may be formed in a form of penetrating the central portion of the black matrix 160, but leaving a peripheral portion of the black matrix 160. Through this, when viewing the touch sensor 600 from the upper surface thereof, the touch sensor 600 may form a ring shape of surrounding peripheries of the device hole 165 by the black matrix 160.

Figure 8:
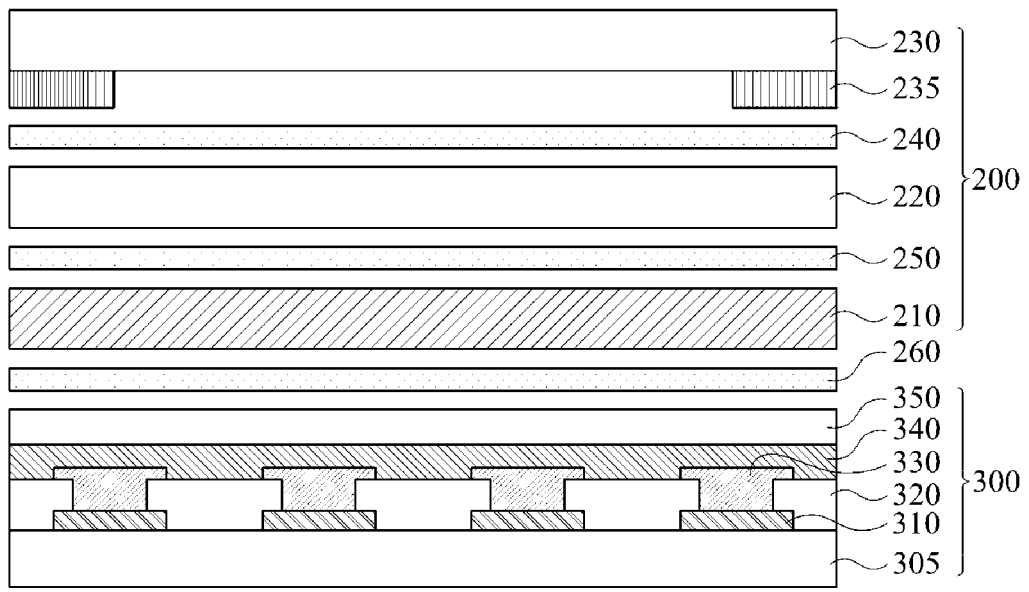
FIG. 8 is a schematic cross-sectional view for describing a window laminate and an image display device according to an embodiment.

FIG. 8 is a schematic cross-sectional view for describing a window laminate and an image display device according to an embodiment.

Referring to FIG. 8, a window laminate 200 may include a window substrate 230, a polarizing layer 220 and a touch sensor 210. Herein, the touch sensor 210 is the same as the touch sensors 100, 400 and 600 described above with reference to FIGS. 1 to 7, therefore will not be described in detail.

The window substrate 230 may include, for example, a hard coating film. According to an embodiment, a light-shielding pattern 235 may be formed on a peripheral portion of one surface of the window substrate 230. The light-shielding pattern 235 may include, for example, a color printing pattern, and may have a single layer or multilayer structure. A bezel part or non-display region of the image display device may be defined by the light-shielding pattern 235.

The polarizing layer 220 may include a coating type polarizer or polarizing plate. The coating type polarizer may include a liquid crystal coating layer including a polymerizable liquid crystal compound and a dichroic dye. In this case, the polarizing layer 220 may further include an alignment film for imparting alignment to the liquid crystal coating layer.

For example, the polarizing plate may include a polyvinyl alcohol polarizer and a protective film attached to at least one surface of the polyvinyl alcohol polarizer.

The polarizing layer 220 may be directly adhered to one surface of the window substrate 230 or may be attached thereto through a first adhesive layer 240.

The touch sensor 210 may be included in the window laminate 200 in a form of a film or panel. According to an embodiment, the touch sensor 210 may be coupled with the polarizing layer 220 through a second adhesive layer 250.

As shown in FIG. 8, the window substrate 230, the polarizing layer 220 and the touch sensor 210 may be disposed in this order from a visible side of a user. In this case, since the sensing electrodes of the touch sensor 210 are disposed under the polarizing layer 220, it is possible to more effectively prevent a phenomenon in which the electrode is viewed.

In an embodiment, the touch sensor 210 may be directly transferred onto the window substrate 230 or the polarizing layer 220. According to an embodiment, the window substrate 230, the touch sensor 210 and the polarizing layer 220 may be disposed in this order from the visible side of the user.

An image display device 800 may include a display panel 300 and the above-described window laminate 200 coupled to the display panel 300.

The display panel 300 may include a pixel electrode 310, a pixel defining layer 320, a display layer 330, a counter electrode 340, and an encapsulation layer 350, which are disposed on a panel substrate 305.

A pixel circuit including a thin film transistor (TFT) may be formed on the panel substrate 305, and an insulation film may be formed thereon to cover the pixel circuit. The pixel electrode 310 may be electrically connected to a drain electrode of the TFT on the insulation film, for example.

The pixel defining layer 320 may be formed on the insulation film to define a pixel area by exposing the pixel electrode 310. A display layer 330 is formed on the pixel electrode 310, and the display layer 330 may include, for example, a liquid crystal layer or an organic light emitting layer.

The counter electrode 340 may be disposed on the pixel defining layer 320 and the display layer 330. The counter electrode 340 may be provided as a common electrode or a cathode of the image display device 800, for example. The encapsulation layer 350 for protecting the display panel 300 may be laminated on the counter electrode 340.

According to an embodiment, the display panel 300 and the window laminate 200 may be coupled with each other through an adhesive layer 260. The adhesive layer 260 may shield a noise from the display panel 300 and relieve an interfacial stress during bending, thereby suppressing the window laminate 200 from being damaged.

Figure 9:
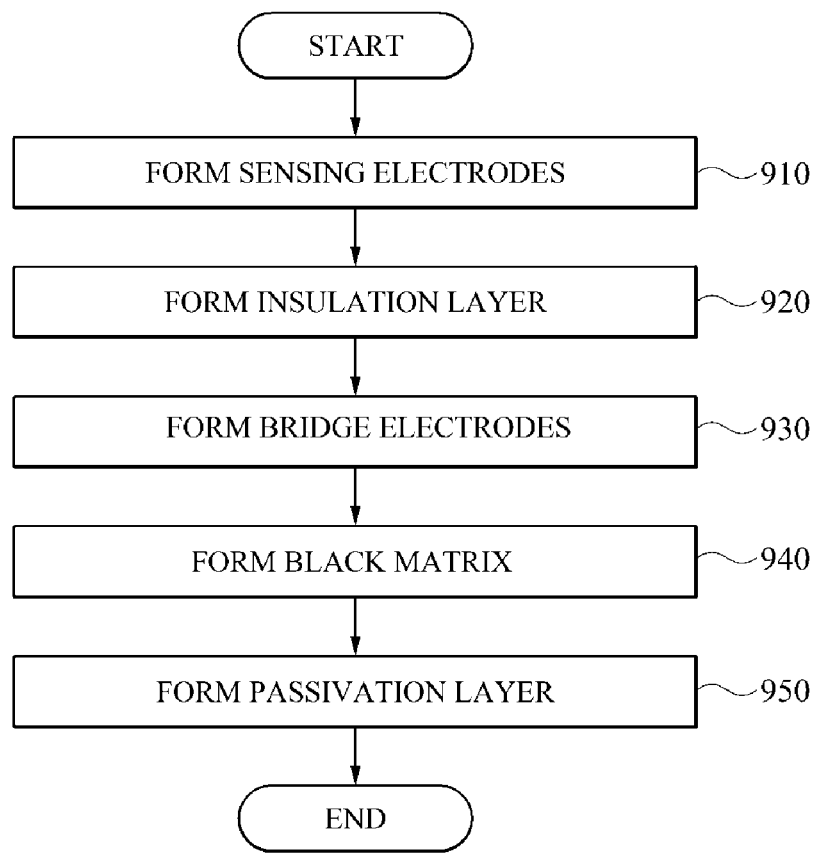
FIG. 9 is a flowchart illustrating a method of manufacturing a touch sensor according to an embodiment.

FIG. 9 is a flowchart illustrating a method of manufacturing a touch sensor according to an embodiment.

Referring to FIGS. 1 to 3, and 9, sensing electrodes 120 and 130 are formed on the substrate layer 110 (910). For example, first sensing electrodes 120, second sensing electrodes 130, and connection parts 125 for connecting the first sensing electrodes 120 adjacent to each other in the x-direction (or row direction) may be formed on the substrate layer 110.

Then, an insulation layer 140 for covering the sensing electrodes 120 and 130 is formed on the substrate layer 110 (920). The insulation layer 140 may electrically insulate the first sensing electrodes 120 and the second sensing electrodes 130, and may include contact holes 145 to which the upper surfaces of the second sensing electrodes 130 are partially exposed.

Next, bridge electrodes 150 for connecting the second sensing electrodes 130 adjacent to each other with the connection part 125 interposed therebetween are formed on the insulation layer 140 (930). For example, the bridge electrodes 150 may be formed on the insulation layer 140 to fill the adjacent contact holes 145.

Thereafter, a black matrix 160 is formed on the insulation layer 140 (940). For example, the black matrix 160 may be formed on the insulation layer 140 by curing a material having high resistance and high optical density (OD), such as carbon black, at 170° C. to 190° C., and more preferably at 180° C.

According to an embodiment, the black matrix 160 may be formed on the insulation layer 140 to cover a portion of the bridge electrode 150. That is, the bridge electrode 150 is formed on the insulation layer 140, and then the black matrix 160 may be formed on the insulation layer 140 to cover a portion of the bridge electrode 150. For example, as shown in FIGS. 1 and 3, the black matrix 160 may be formed so as to partially cover the bridge electrode 150a. But, it is not limited thereto, and the black matrix 160 may be formed on the same layer as the bridge electrode 150 with being spaced apart from each other.

According to an embodiment, as shown in FIGS. 1 and 3, the black matrix 160 may be formed at a position of being at least partially overlapped with at least one of the connection parts 125 and the sensing electrodes 120 and 130. But, it is not limited thereto, and the black matrix 160 may be formed at a position of not being overlapped with any of the connection parts 125 and the sensing electrodes 120 and 130.

Finally, a passivation layer 170 for covering the bridge electrodes 150 and the black matrix 160 is formed on the insulation layer 140 (950).

Figure 10:
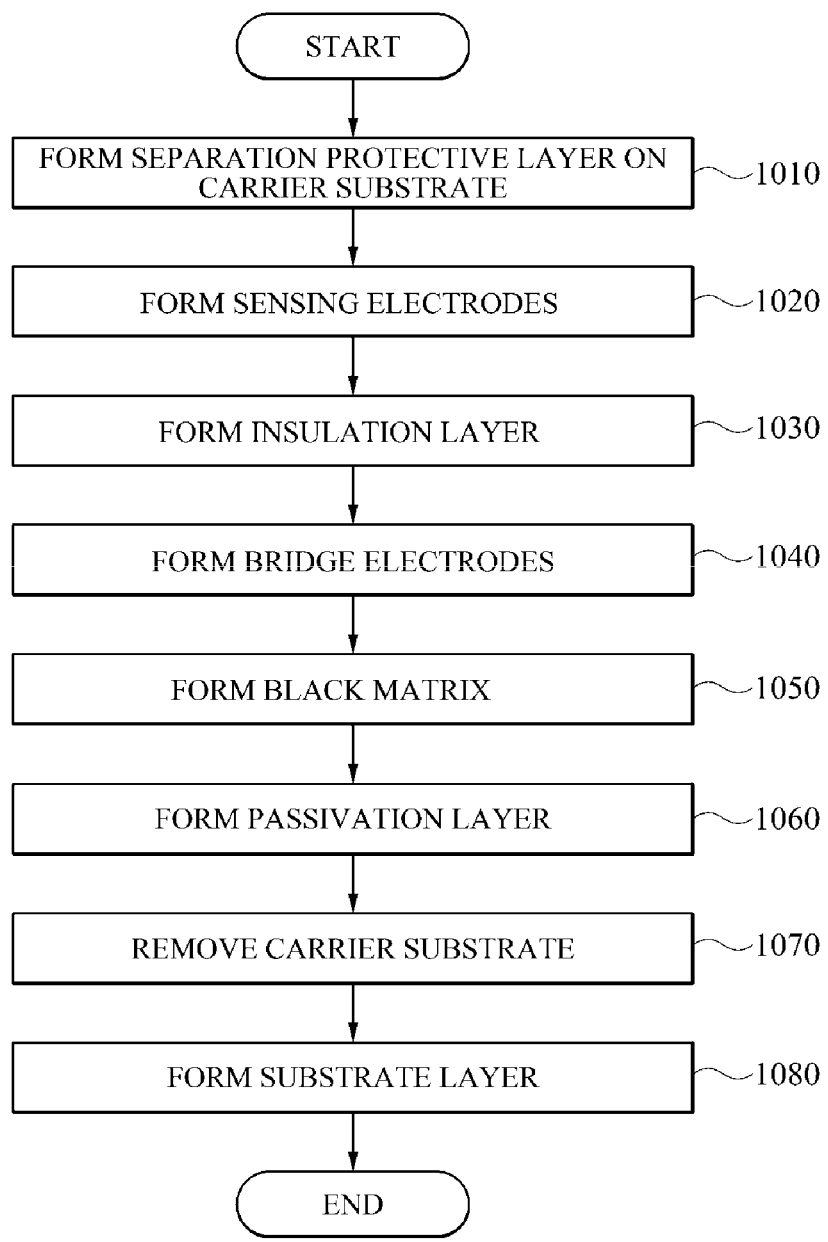
FIG. 10 is a flowchart illustrating a method of manufacturing a touch sensor according to another embodiment.

FIG. 10 is a flowchart illustrating a method of manufacturing a touch sensor according to another embodiment.

Referring to FIGS. 1 to 3, and 10, a separation protective layer 115 is formed on the carrier substrate (1010).

Then, sensing electrodes 120 and 130 are formed on the separation protective layer 115 (1020). For example, first sensing electrodes 120, second sensing electrodes 130, and connection parts 125 for connecting the first sensing electrodes 120 adjacent to each other in the x-direction (or row direction) may be formed on the separation protective layer 115.

Then, an insulation layer 140 for covering the sensing electrodes 120 and 130 is formed on the separation protective layer 115 (1030). The insulation layer 140 may electrically insulate the first sensing electrodes 120 and the second sensing electrodes 130 and, may include contact holes 145 to which the upper surfaces of the second sensing electrodes 130 are partially exposed.

Next, bridge electrodes 150 for connecting the second sensing electrodes 130 adjacent to each other with the connection part 125 interposed therebetween are formed on the insulation layer 140 (S1040). For example, the bridge electrodes 150 may be formed on the insulation layer 140 to fill the adjacent contact holes 145.

Then, a black matrix 160 is formed on the insulation layer 140 (1050). For example, the black matrix 160 may be formed on the insulation layer 140 by curing a material having high resistance and high optical density (OD), such as carbon black, at 170° C. to 190° C., and more preferably at 180° C.

Thereafter, a passivation layer 170 for covering the bridge electrode 150 and the black matrix 160 is formed on the insulation layer 140 (1060).

Then, the carrier substrate is removed (1070). For example, a laminate including the separation protective layer 115, the sensing electrodes 120 and 130, the insulation layer 140, the bridge electrode 150, the black matrix 160 and the passivation layer 170 may be peeled off from the carrier substrate.

Finally, a substrate layer 110 is formed on a lower surface of the separation protective layer 115 (1080).

Meanwhile, according to an embodiment, the substrate layer 110 may be formed on the upper surface of the passivation layer 170 in step 1080.

Also, according to an embodiment, an index matching layer for improving visibility may be added to the upper surface of the separation protective layer 115. The index matching layer may be formed between the separation protective layer 115 and the sensing electrodes 120 and 130 for the purpose of improving visibility through refractive index matching with the sensing electrodes 120 and 130.

FIG. 11 is a flowchart illustrating a method of manufacturing a touch sensor according to another embodiment.

Referring to FIGS. 4, 5 and 11, sensing electrodes 120 and 130 are formed on the substrate layer 110 (1110). For example, first sensing electrodes 120, second sensing electrodes 130, and connection parts 125 for connecting the first sensing electrodes 120 adjacent to each other in the x-direction (or row direction) may be formed on the substrate layer 110.

Then, an insulation layer 140 for covering the sensing electrodes 120 and 130 is formed on the substrate layer 110 (1120). The insulation layer 140 may electrically insulate the first sensing electrodes 120 and the second sensing electrodes 130 and, may include contact holes 145 to which the upper surfaces of the second sensing electrodes 130 are partially exposed.

Then, a black matrix 160 is formed on the insulation layer 140 (1130). For example, the black matrix 160 may be formed on the insulation layer 140 by curing a material having high resistance and high optical density (OD), such as carbon black, at 170° C. to 190° C., and more preferably at 180° C.

Thereafter, bridge electrodes 150 are formed on the insulation layer 140 to connect the second sensing electrodes 130 adjacent to each other with the connection part 125 interposed therebetween (1140). For example, the bridge electrodes 150 may be formed on the insulation layer 140 to fill the adjacent contact holes 145. According to an embodiment, at least one bridge electrode 150a of the bridge electrodes 150 may be formed on the insulation layer 140 to cover a portion of the black matrix 160. That is, the black matrix 160 is formed on the insulation layer 140, and then a portion of the bridge electrode 150 may be formed on the insulation layer 140 to partially cover the black matrix 160. But, it is not limited thereto, and the black matrix 160 may be formed on the same layer as the bridge electrode 150 with being spaced apart from each other.

Finally, a passivation layer 170 for covering the bridge electrode 150 and the black matrix 160 is formed on the insulation layer 140 (1150).

FIG. 12 is a flowchart illustrating a method of manufacturing a touch sensor according to another embodiment.

Referring to FIGS. 6, 7 and 12, sensing electrodes 120 and 130 are formed on the substrate layer 110 (1210). For example, first sensing electrodes 120, second sensing electrodes 130, and connection parts 125 for connecting the first sensing electrodes 120 adjacent to each other in the x-direction (or row direction) may be formed on the substrate layer 110.

Then, an insulation layer 140 for covering the sensing electrodes 120 and 130 is formed on the substrate layer 110 (1220). The insulation layer 140 may electrically insulate the first sensing electrodes 120 and the second sensing electrodes 130 and, may include contact holes 145 to which the upper surfaces of the second sensing electrodes 130 are partially exposed.

Then, bridge electrodes 150 for connecting the second sensing electrodes 130 adjacent to each other with the connection part 125 interposed therebetween are formed on the insulation layer 140 (1230). For example, the bridge electrodes 150 may be formed on the insulation layer 140 to fill the adjacent contact holes 145.

Next, a black matrix 160 is formed on the insulation layer 140 (1240). For example, the black matrix 160 may be formed on the insulation layer 140 by curing a material having high resistance and high optical density (OD), such as carbon black, at 170° C. to 190° C., and more preferably at 180° C.

Thereafter, a passivation layer 170 for covering the bridge electrode 150 and the black matrix 160 is formed on the insulation layer 140 (1250).

Finally, a device hole 165 which penetrates the central portion of the black matrix 160 is formed (1260). For example, the device hole 165 may be formed by penetrating the passivation layer 170, the black matrix 160, the insulation layer 140 and the substrate layer 110 in a direction perpendicular to the upper surface of the black matrix 160.

According to an embodiment, the device hole 165 may be formed in a size that does not affect the sensing electrodes 120 and 130, the connection part 125 and the bridge electrode 150 adjacent thereto, that is, in a size that does penetrate the sensing electrodes 120 and 130, the connection part 125 and the bridge electrode 150 adjacent thereto. But, it is not limited thereto, and the device hole 165 may be formed by at least partially penetrating any one or two or more of the adjacent sensing electrodes 120 and 130, the connection part 125 and the bridge electrode 150.

According to an embodiment, the device hole 165 may be formed in a form of penetrating the central portion of the black matrix 160, but leaving a peripheral portion of the black matrix 160t. Through this, when viewing the touch sensor 600 from the upper surface thereof, the touch sensor 600 may form a ring shape of surrounding peripheries of the device hole 165 by the black matrix 160.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

EXPERIMENTAL EXAMPLE

As shown in FIGS. 1 to 3, a black matrix was formed on an insulation layer to prepare ten (10) touch sensor samples. For each of the prepared 10 samples, 4 kv, 6 kv, 8 kv, 10 kv, 12 kv, and 15 kv of static electricity were sequentially applied to positions 20 mm spaced apart from a left side of the black matrix, and as a result of checking whether defects occurred, results shown in Table 1 below were obtained.

TABLE 1

| Electrostatic voltage | 4 kv | 6 kv | 8 kv | 10 kv | 12 kv | 15 kv |
|---|---|---|---|---|---|---|
| Number of defects | 0 | 0 | 0 | 0 | 0 | 0 |

Referring to Table 1, it can be seen that defects do not occur in all 10 samples having the black matrix formed on the insulation layer. That is, from the experimental example of Table 1, it can be seen that when forming the black matrix on the insulation layer, the black matrix absorbs static electricity generated from an outside, such that damage to the touch sensor may be reduced.

What is claimed is:

1. A touch sensor comprising:
   a substrate layer;
   sensing electrodes formed on the substrate layer;
   an insulation layer formed on the substrate layer to cover the sensing electrodes;
   bridge electrodes formed on the insulation layer to electrically connect some sensing electrodes adjacent to each other among the sensing electrodes; and
   a black matrix formed on the insulation layer,
   wherein at least one bridge electrode of the bridge electrodes is partially covered by the black matrix so that both end portions of the at least one bridge electrode protrude from the black matrix in a plan view, and a remaining portion of the at least one bridge electrode is completely covered by the matrix in the plan view.

2. The touch sensor according to claim 1, wherein the bridge electrodes and the black matrix are spaced apart from each other.

3. The touch sensor according to claim 1, wherein the black matrix is formed by curing a predetermined material at 170° C. to 190° C.

4. The touch sensor according to claim 3, wherein the predetermined material includes carbon black.

5. The touch sensor according to claim 1, wherein the sensing electrodes include a transparent conductive oxide.

6. The touch sensor according to claim 1, wherein the sensing electrodes are formed in a multilayer structure of a transparent conductive oxide layer and a metal layer.

7. The touch sensor according to claim 1,
   wherein the sensing electrodes comprise: first sensing electrodes which form a sensing channel row; and
   second sensing electrodes which form a sensing channel column,
   wherein the bridge electrodes electrically connect the second sensing electrodes adjacent to each other in a column direction.

8. The touch sensor according to claim 7, wherein the insulation layer comprises contact holes to which surfaces of the second sensing electrodes are partially exposed; and
   the bridge electrodes are formed on the insulation layer to fill the contact holes.

9. The touch sensor according to claim 1, further comprising a passivation layer formed on the insulation layer to cover the black matrix.

10. The touch sensor according to claim 1, further comprising a separation protective layer formed on an upper surface of the substrate layer.

11. The touch sensor according to claim 1, further comprising a device hole which penetrates the black matrix.

12. The touch sensor according to claim 11, wherein the device hole penetrates a central portion of the black matrix while leaving a peripheral portion of the black matrix.

13. An image display device comprising:
a display panel; and
the touch sensor according to claim 1 laminated on the display panel.

14. A method of manufacturing a touch sensor comprising:
forming first sensing electrodes and second sensing electrodes on a substrate layer or a separation protective layer;
forming an insulation layer to cover the first sensing electrodes and the second sensing electrodes on the substrate layer or the separation protective layer;
forming bridge electrodes on the insulation layer to electrically connect second sensing electrodes adjacent to each other;
forming a black matrix on the insulation layer; and
forming a passivation layer on the insulation layer to cover the black matrix,
wherein at least one bridge electrode of the bridge electrodes is partially covered by the black matrix so that both end portions of the at least one bridge electrode protrude from the black matrix in a plan view, and a remaining portion of the at least one bridge electrode is completely covered by the black matrix in the plan view.

15. The method of manufacturing a touch sensor according to claim 14, wherein the step of forming the black matrix comprises curing a predetermined material at 170° C. to 190° C. to form the black matrix.

16. The method of manufacturing a touch sensor according to claim 14, further comprising forming a device hole through the black matrix.

17. The method of manufacturing a touch sensor according to claim 16, wherein the device hole penetrates a central portion of the black matrix while leaving a peripheral portion of the black matrix.

* * * * *